US012713101B2

(12) United States Patent
Lee et al.

(10) Patent No.: US 12,713,101 B2
(45) Date of Patent: Aug. 18, 2026

(54) MULTIMEDIA DEVICE AND CONTROL METHOD THEREOF

(71) Applicant: LG ELECTRONICS INC., Seoul (KR)

(72) Inventors: Kiwoong Lee, Seoul (KR); Hyunseung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/851,563

(22) PCT Filed: May 13, 2022

(86) PCT No.: PCT/KR2022/006896
§ 371 (c)(1),
(2) Date: Sep. 26, 2024

(87) PCT Pub. No.: WO2023/219191
PCT Pub. Date: Nov. 16, 2023

(65) Prior Publication Data
US 2025/0193495 A1 Jun. 12, 2025

(51) Int. Cl.

| | |
|---|---|
| ***H04N 21/482*** | (2011.01) |
| ***G10L 15/22*** | (2006.01) |
| ***G10L 15/26*** | (2006.01) |
| ***H04N 21/422*** | (2011.01) |

(52) U.S. Cl.
CPC ......... *H04N 21/4828* (2013.01); *G10L 15/22* (2013.01); *G10L 15/26* (2013.01); *H04N 21/42203* (2013.01)

(58) Field of Classification Search
CPC .......... H04N 21/4828; H04N 21/42203; G10L 15/22; G10L 15/26
See application file for complete search history.

(56) References Cited

U.S. PATENT DOCUMENTS

| | | | | |
|---|---|---|---|---|
| 2017/0264939 | A1 | 9/2017 | Jang et al. | |
| 2025/0156707 | A1 * | 5/2025 | Hwang | G06N 3/09 |

FOREIGN PATENT DOCUMENTS

| | | |
|---|---|---|
| KR | 1020060091426 | 8/2006 |
| KR | 10-2019-0141569 | 12/2019 |
| KR | 1020200008341 | 1/2020 |
| KR | 1020200074635 | 6/2020 |
| KR | 10-2020-0085115 | 7/2020 |
| KR | 1020210068353 | 6/2021 |
| WO | 2020111292 | 6/2020 |

OTHER PUBLICATIONS

European Patent Office Application Serial No. 22941778.7, Search Report dated Feb. 21, 2025, 7 pages.
PCT International Application No. PCT/KR2022/006896, International Search Report dated Feb. 6, 2023, 17 pages.

* cited by examiner

*Primary Examiner* — Nicholas T Corbo
(74) *Attorney, Agent, or Firm* — LEE, HONG, DEGERMAN, KANG & WAIMEY

(57) ABSTRACT

A control method of a multimedia device, according to one embodiment of the present disclosure, comprises the steps of: displaying a video of content on a screen of the multimedia device; receiving audio data corresponding to a voice uttered by a user, recognizing the voice of the received audio data by referring to a memory; and executing a command according to a result of the voice recognition.

12 Claims, 13 Drawing Sheets

MULTIMEDIA DEVICE AND CONTROL METHOD THEREOF

CROSS-REFERENCE TO RELATED APPLICATION(S)

This application is the National Stage filing under 35 U.S.C. 371 of International Application No. PCT/KR2022/006896, filed on May 13, 2022, the contents of which are all incorporated by reference herein in its entirety.

TECHNICAL FIELD

The present disclosure relates to voice recognition, and may be applied to various multimedia devices for voice recognition (e.g., televisions, mobile phone, tablet PC, laptop, or desktop).

BACKGROUND

As voice recognition technology has recently developed, the number of multimedia devices that use voice recognition technology has increased. In addition to conventional touch interfaces and remote controllers, voice recognition technology is expected to play an important role as an interface for controlling multimedia devices.

As voice feature extraction technologies, for example, linear predictive coefficient technology, Cepstrum technology, Mel frequency cepstral coefficient (MFCC) technology, filter bank energy technology, and filter bank energy technology are known.

However, conventional speech recognition technology is a statistical system based on existing language models and dictionaries, and thus there is a problem that a recognition rate for new words is considerably low.

To resolve this problem, research is required to improve voice recognition rates in multimedia devices (e.g., TVs).

DISCLOSURE

Technical Problem

An embodiment of the present disclosure is to improve a voice recognition rate depending on the situation by dynamically changing and establishing a dictionary model according to the current state of a multimedia device and applying a speech to text (STT) module.

Another embodiment of the present disclosure is to improve a voice recognition rate by setting different weights for each data defined in a dictionary model (or considering the accuracy of a source from which the data is obtained).

Technical Solution

According to an embodiment of the present disclosure, a method of controlling a multimedia device includes displaying a video of content on a screen of the multimedia device, receiving audio data related with a voice uttered by a user recognizing a voice of the received audio data with reference to the memory, and executing a command according to the voice recognition result. The voice recognition result may vary, for example, depending on additional information of the content.

The additional information of the content includes, for example, at least one of electronic program guide (EPG) information, information extracted from the video, or text information output through an application.

The additional information of the content may be stored in, for example, the memory.

The method may further include converting the received audio data into a plurality of candidate keywords through a speech to text (STT) module.

According to another embodiment of the present disclosure, the method may further include executing a command according to a specific keyword from among the plurality of candidate keywords when the specific keyword matches the EPG information or the text information stored in the memory.

According to another embodiment of the present disclosure, the method may further include increasing a recognition coefficient for a specific keyword from among the plurality of candidate keywords when the specific keyword matches the information extracted from the video.

The multimedia device may include a television (TV), and the audio data may be received through a microphone of the TV or a remote controller.

According to an embodiment of the present disclosure, a multimedia device includes a display configured to display a video of content on a screen of the multimedia device, a microphone configured to receive audio data related with a voice uttered by a user, and a controller configured to recognize a voice of the received audio data with reference to the memory and execute a command according to the voice recognition result. The voice recognition result may vary depending on additional information of the content.

Advantageous Effects

As described above, conventional voice recognition technology has a problem that it takes a lot of time to perform a postprocessing operation by finding words that are difficult to recognize with speech to text (STT) and updating a dictionary each time, and accuracy is still low.

In contrast, according to an embodiment of the present disclosure, the recognition performance of STT may be advantageously may be improved by updating a dictionary model in real time depending on the situation.

The effects obtainable from the present disclosure are not limited to the effects described above, and other effects not described may be clearly understood by those skilled in the art to which the present disclosure belongs from the description below.

DETAILED DESCRIPTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
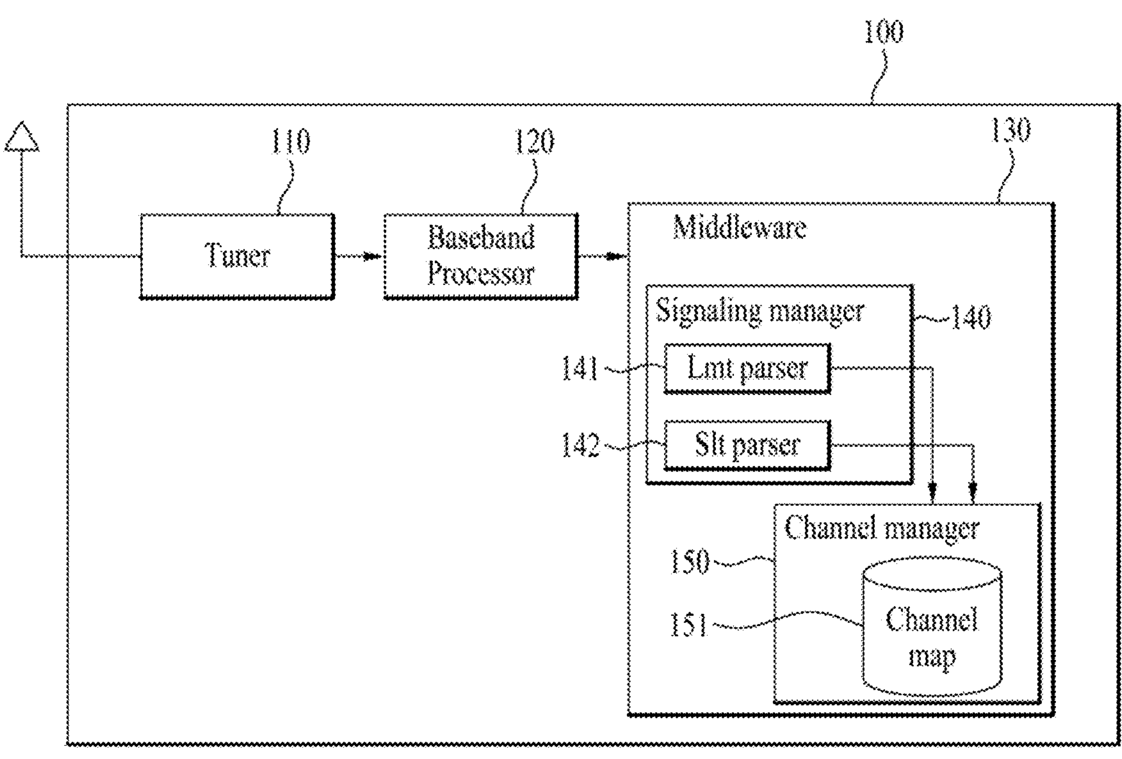
FIG. 1 illustrates components inside a television (TV) according to an embodiment of the present disclosure.

FIG. 1 is a diagram illustrating components inside a TV according to an embodiment of the present disclosure.

The present disclosure is applicable to various TV products, for example, the Digital Video Broadcasting (DVB) standard, which is a European standard, the Advanced Television Systems Committee (ATSC) 3.0 standard, which is a North American/Korean standard, etc.

In FIG. 1, a process for a TV 100 to perform and initial service scan operation in accordance with the ATSC 3.0 standard will be illustrated, but the scope of the rights of the present disclosure should be determined according to the matters described in the claims.

A tuner 110 determines whether a signal is present by using a predefined frequency list. If a signal is detected at a given frequency, a baseband processor 120 extracts L1 signaling of a preamble.

Furthermore, the baseband processor 120 transmits Physical Layer Pipe (PLP) data including link layer signaling and Low Level Signaling (LLS) to a middleware 130, and the middleware 130 may extract the link layer signaling and the LLS from the PLP data.

Meanwhile, the middleware 130 includes a signaling manager 140 and a channel manager 150.

The middleware 130 receives the PLP data including the link layer signaling and the LLS from the baseband processor 120 and passes the data to an appropriate parser.

For example, the middleware 130 extracts Link Mapping Table (LMT) from the link layer signaling and passes the LMT to an LMT parser 141. Furthermore, the middleware 130 extracts Service List Table (SLT) from the LLS and passes the SLT to an SLT parser 142.

The LMT parser 141 parses the LMT and extracts first information (e.g., PLPID, session information (IP address and port number), etc.) necessary to generate a channel map.

The SLT parser 142 parses the SLT and extracts second information (e.g., service id, service name, etc.) necessary to generate the channel map.

The extracted first information and second information are stored in a channel map 151.

Figure 2:
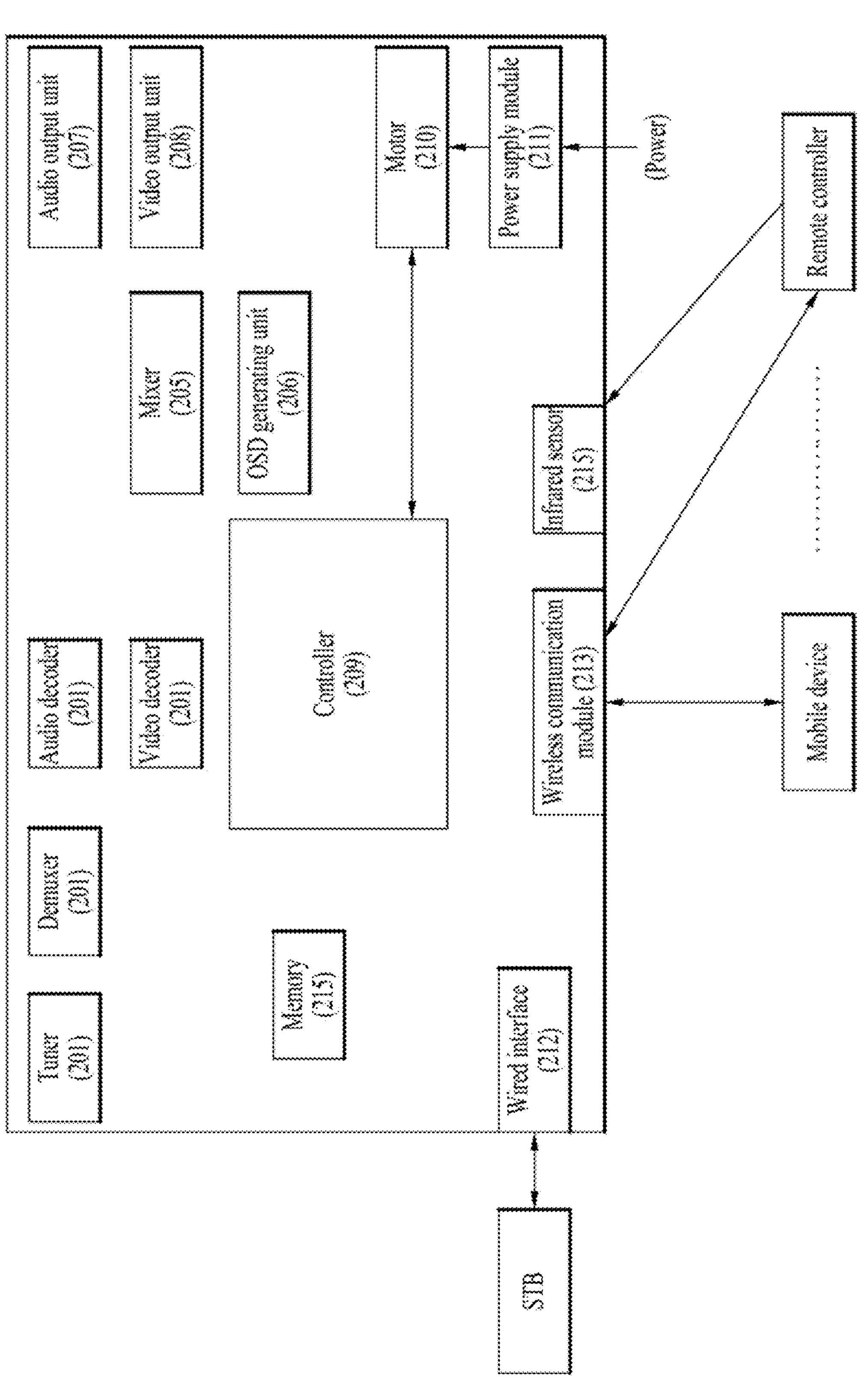
FIG. 2 illustrates components inside a TV in addition to an external device according to another embodiment of the present disclosure.

FIG. 2 shows components inside a TV and an external device according to another embodiment of the present disclosure. Those skilled in the art may implement the present disclosure by combining some components with reference to FIGS. 1 and 2. For example, the baseband processor 120 and the middleware 130 shown in FIG. 1 may be included in a controller 209 shown in FIG. 2.

Although a TV 200 shown in FIG. 2 includes various components, the scope of the rights of the present disclosure is not limited thereto and should be determined according to the matters described in the claims.

Moreover, the components inside the TV 200 shown in FIG. 2 may be controlled through the controller 209, and each of the components may be directly or indirectly connected thereto. That is, although not shown in FIG. 2, all of the components inside the TV 200 of FIG. 2 are designed to directly or indirectly transmit and receive control signals and/or data.

First, a tuner 201 receives a broadcast signal through an antenna or the like, and a demuxer (demux or demultiplexer) 202 demultiplexes audio data and video data included in the broadcast signal.

An audio decoder 203 decodes the audio data (in encoded state) included in the broadcast signal, and a video decoder 204 decodes the video data (in encoded state) included in the broadcast signal.

The decoded audio data is outputted through an audio output unit 207. The audio output unit 207 may be, for example, a speaker attached to or spaced apart from the TV 200.

Meanwhile, the decoded video data is directly outputted through a video output unit 208. Alternatively, a mixer 205 mixes menu data generated by an OSD generating unit 206 and the video data and then transmits the mixed menu data to the video output unit 208.

A memory 215 stores various control data and commands for controlling the TV 200, and the controller 209 may control all components in the TV with reference to the memory 215.

Furthermore, the TV 200 transmits and receives data through communication with various peripheral external devices. For example, video and audio data are received from an STB 220 via a wired interface 212, and then processed by the audio decoder 203 and the video decoder 204, respectively. Alternatively, the received video and audio data may be directly outputted through the audio output unit 207 and the video output unit 208 without passing through the decoders 203 and 204.

Various data is transmitted and received with a mobile device 230 (e.g., a mobile phone, a wearable device, etc.) via a wireless communication module 213, and an infrared (IR) signal of a remote controller 240 is received through an infrared sensor 214. Alternatively, the remote controller 240 capable of Bluetooth communication such as BT transmits and receives various data to and from the TV via the wireless communication module 213.

Figure 3:
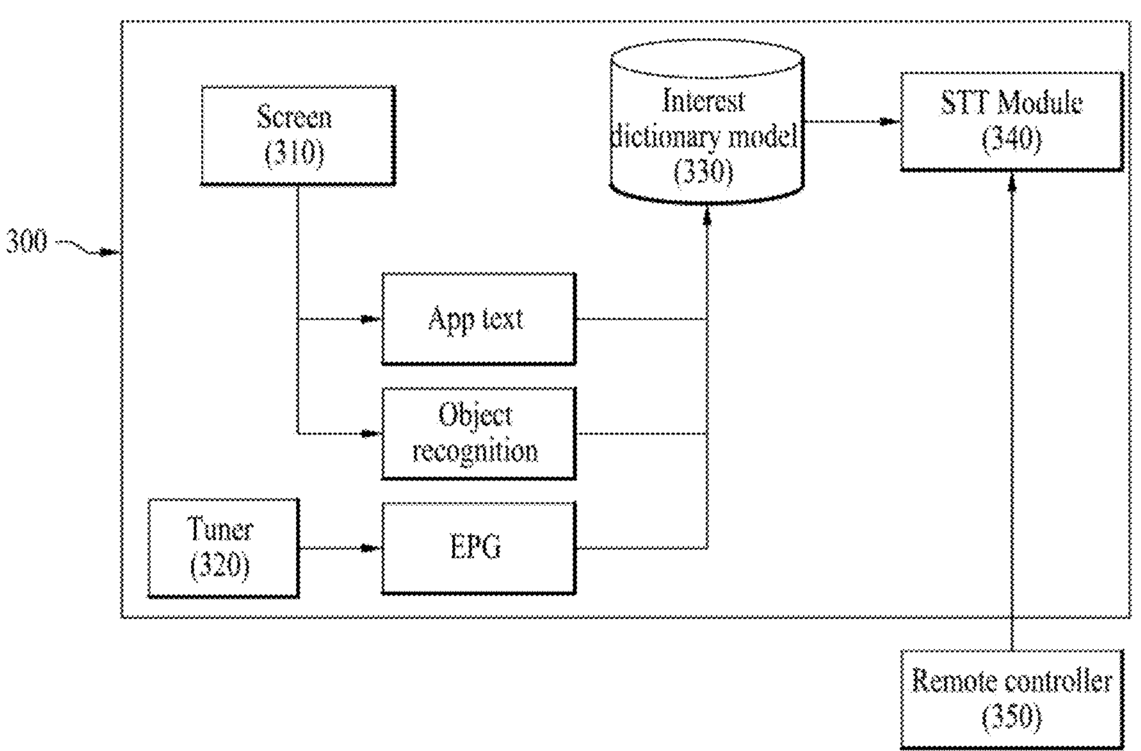
FIG. 3 is a block diagram illustrating main components of a multimedia device for improving voice recognition performance according to an embodiment of the present disclosure.

FIG. 3 is a block diagram illustrating main components of a multimedia device for improving voice recognition performance according to an embodiment of the present disclosure. Those skilled in the art may be capable of providing supplementary interpretations of a multimedia device 300 illustrated in FIG. 3 with reference to a television (TV) illustrated in FIG. 1 or FIG. 2.

As illustrated in FIG. 3, the multimedia device 300 according to an embodiment of the present disclosure includes a screen 310, a tuner 320, an interest dictionary model 330, a speech to text (STT) module 340, and a controller (not shown).

The multimedia device 300 receives a user voice through a remote controller 350 and performs a voice recognition process. Receiving a user voice through a microphone installed in the multimedia device 300 also falls within another scope of the present disclosure.

The screen 310 displays a video provided in at least one content, and the STT module 340 receives audio data corresponding to a voice uttered by a user through the remote controller 350 or a microphone (not shown) installed in the multimedia device 300.

The multimedia device 300 is designed such that the controller (not shown) recognizes voice of the received audio data with reference to a memory and executes a command according to the voice recognition result.

In particular, according to an embodiment of the present disclosure, the multimedia device 300 is designed such that the controller changes the voice recognition result described above depending on additional information of content (e.g., App text, object detection, or electronic program guide (EPG) information).

In more detail, for example, the additional information of the content includes at least one of electronic program guide (EPG) information, information extracted from the video, or text information output through an application.

The multimedia device 300 is designed such that the controller updates the interest dictionary model 330 stored in the memory in real time based on information (an App text or an object recognition result) displayed on the screen 310 and EPG information received from the tuner 320.

The STT module 340 converts audio data received from the remote controller 350 or the like into a plurality of candidate keywords.

When a specific keyword from among the plurality of candidate keywords matches the EPG information or the text information stored in the interest dictionary model 330 of the memory, the controller executes a command according to the specific keyword.

In contrast, when the specific keyword from among the plurality of candidate keywords matches the information extracted from the video, the multimedia device 300 is designed such that the controller increases a recognition coefficient for the specific keyword rather than immediately executing a command according to the specific keyword. The design is obtained in consideration with a problem that information extracted from video may contain error unlike EPG information. Therefore, there is a technical effect of further improving voice recognition performance.

A more specific technology for updating the interest dictionary model 330 illustrated in FIG. 3 in real time is described in more detail later with reference to FIG. 4.

Figure 4:
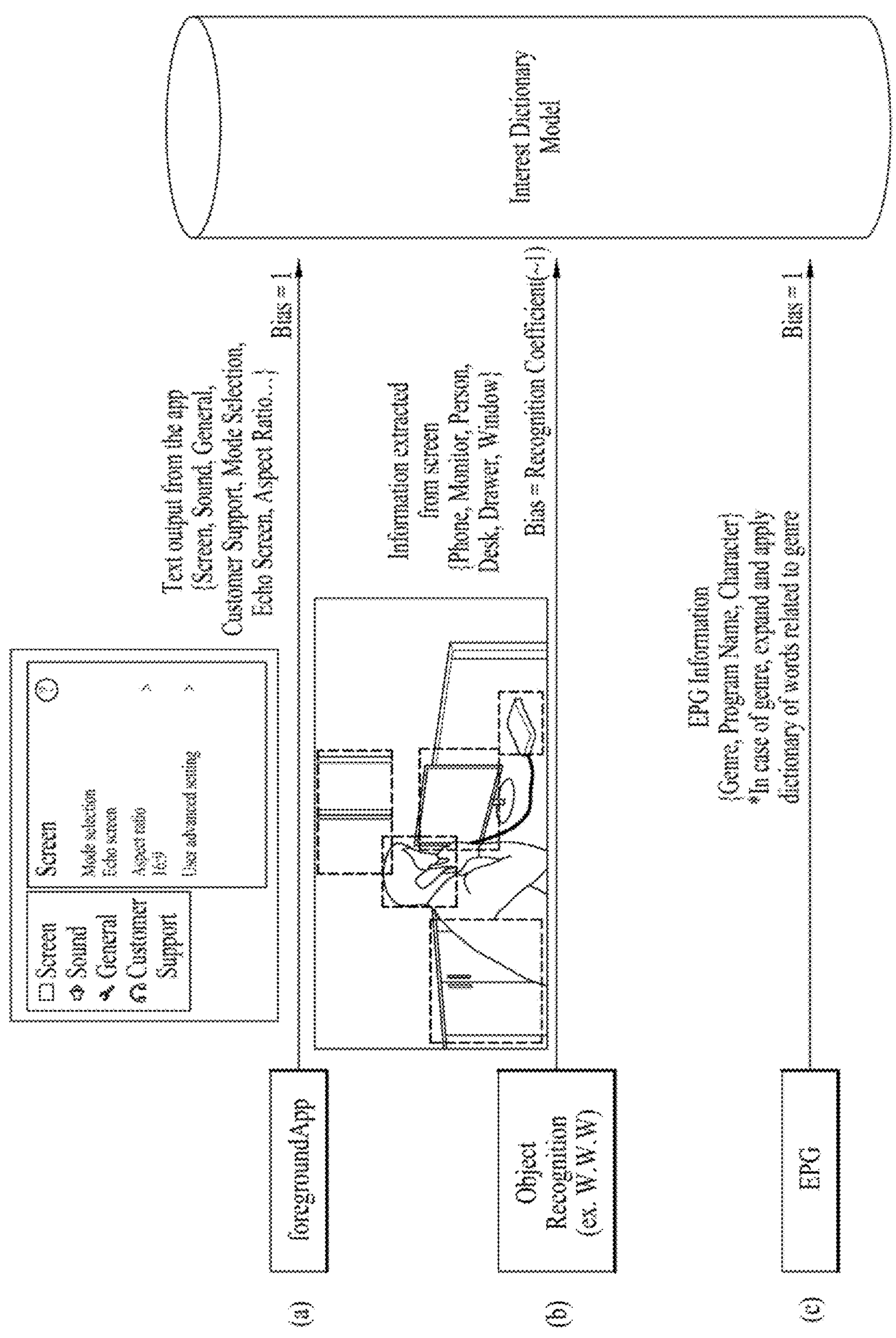
FIG. 4 illustrates a process for updating an interest dictionary model for use in voice recognition in real time according to an embodiment of the present disclosure.

FIG. 4 illustrates a process for updating an interest dictionary model for use in voice recognition in real time according to an embodiment of the present disclosure.

(a) of FIG. 4 shows a process for updating text information output by an application executed on a multimedia device into an interest dictionary model.

As shown in (a) of FIG. 4, the text information output by the application includes, for example, "screen," "sound," "general," "customer support," "mode selection," "echo screen," or "screen ratio". According to an embodiment of the present disclosure, the multimedia device is designed such that the controller delivers the text information output by the application to the interest dictionary model and refers to the interest dictionary model when a voice recognition function is executed. In this case, a bias recognition coefficient is set to 1 (which corresponds to, for example, accuracy of 100%) because the text information output by the application is information supported by the application, and thus there is no possibility in that errors occur.

(b) of FIG. 4 shows a process for performing object recognition from video data displayed on a multimedia device and updating this into an interest dictionary model.

As shown in (b) of FIG. 4, object information (e.g., phone, monitor, person, desk, drawer, or window) is extracted from a screen of a multimedia device using automatic content recognition (ACR) technology, or the like. According to an embodiment of the present disclosure, the multimedia device is designed such that the controller delivers the object information extracted from the screen of the multimedia device to the interest dictionary model and refers to the interest dictionary model when a voice recognition function is executed. Unlike (a) of FIG. 4 described above, the bias recognition coefficient is set to less than 1 (which corresponds to, for example, an accuracy of less than 100%), and this design is obtained by considering the possibility in that the object information extracted from the screen may contain errors due to the characteristics of ACR.

(c) of FIG. 4 shows a process for updating an interest dictionary model by using EPG information received from a tuner of a multimedia device or an external device (STB).

As shown in (c) of FIG. 4, when content currently output by the multimedia device is about a broadcast program, EPG information (e.g., genre name, program name, or character information) is received. According to an embodiment of the present disclosure, the multimedia device is designed such that the controller delivers the EPG information received by the multimedia device to the interest dictionary model and refers to the interest dictionary model when a voice recognition function is executed. Unlike (b) of the FIG. 4 described above, in (c) of FIG. 4, the bias recognition coefficient is set to 1 (which is a concept corresponding to, for example, accuracy of 100%) because EPG information is information provided by a broadcasting station or the like, and thus there is no possibility in that errors occur.

As such, depending on a type (or source) of additional information of the content, the multimedia device according to an embodiment of the present disclosure has a feature that is clearly different from the conventional art in that the multimedia device changes whether to directly apply the multimedia device in the voice recognition function or to perform another correction operation.

A process of performing additional correction related to voice recognition is described in more detail below with reference to FIGS. 5 and 6.

Figure 5:
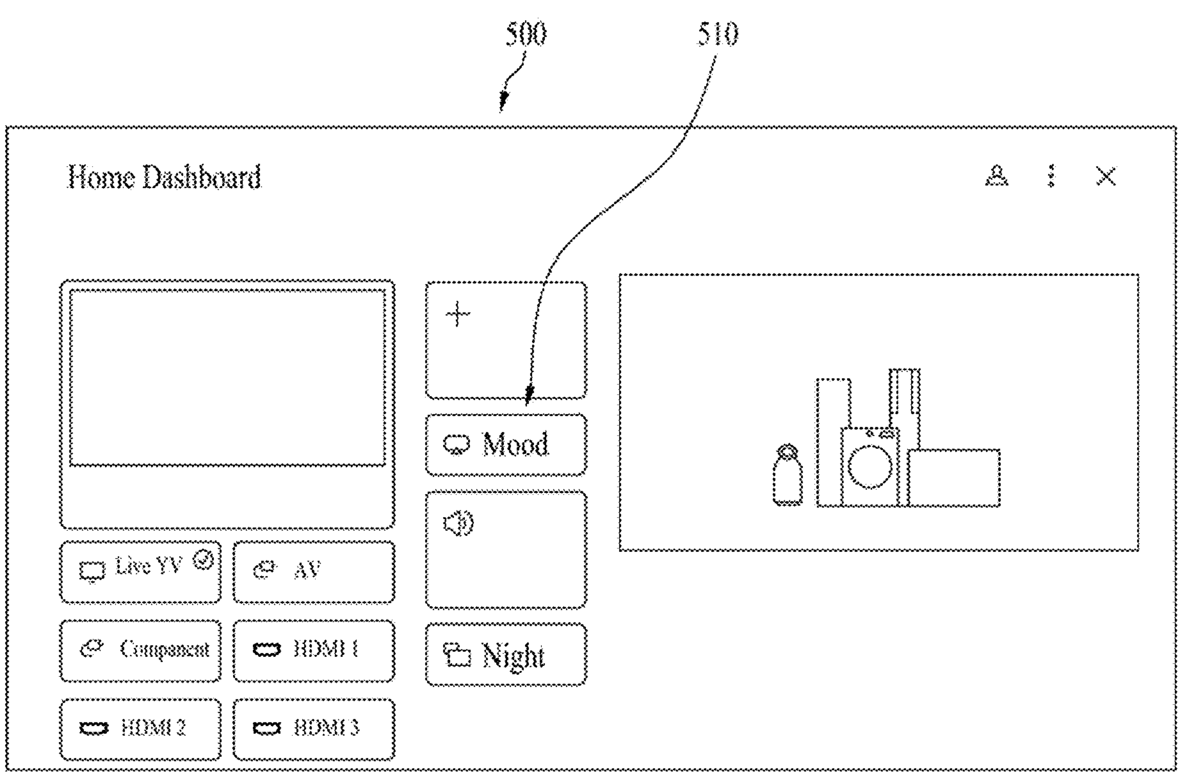
FIG. 5 illustrates a case in which a multimedia device according to an embodiment of the present disclosure executes an arbitrary application.

FIG. 5 illustrates a case in which a multimedia device according to an embodiment of the present disclosure executes an arbitrary application.

As shown in FIG. 5, it is assumed that a multimedia device 500 according to an embodiment of the present disclosure displays a video corresponding to a home-related application.

In this case, a user of the multimedia device 500 utters a voice for selecting any keyword 510 (or option) through a microphone installed in a remote controller or through a microphone installed in the multimedia device 500.

Unlike the conventional art, as described above, the multimedia device 500 according to an embodiment of the present disclosure is designed to collect additional information related to an application in advance and automatically update an interest dictionary model (e.g., stored in memory) based on the collected additional information.

Here, additional information related to the application may be detected through, for example, an ACR function, or may be data predefined in the application.

Figure 6:
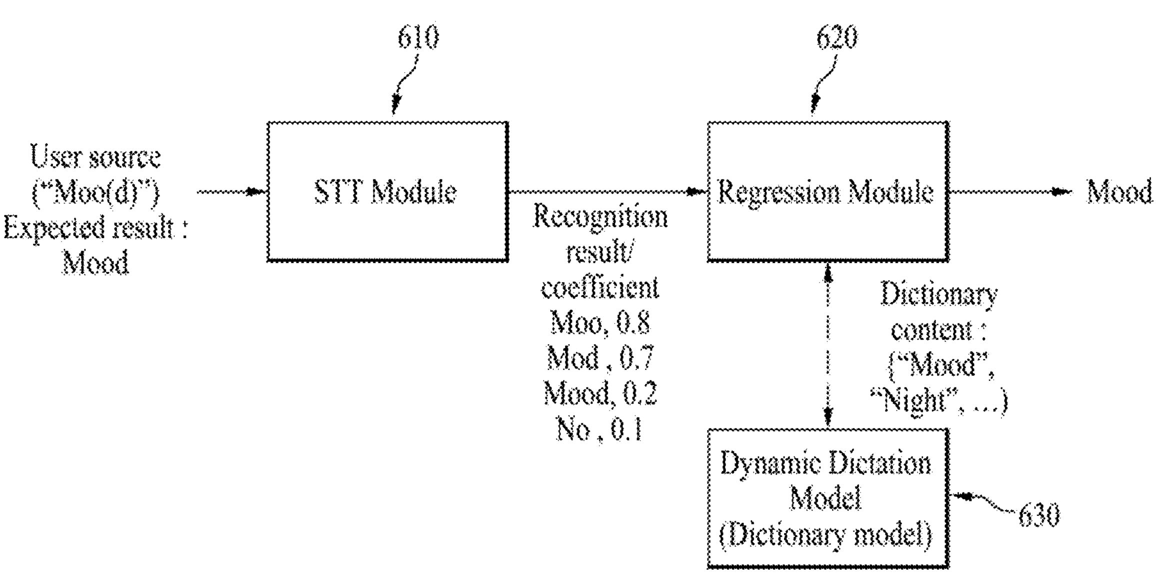
FIG. 6 illustrates a recognition process for a specific keyword in a screen shown in FIG. 5.

FIG. 6 illustrates a recognition process for a specific keyword in a screen shown in FIG. 5.

An STT module 610, a regression analysis module 620, and a dictionary model 630 illustrated in FIG. 6 are included in, for example, the multimedia device described above.

The STT module 610 is designed to receive a voice signal uttered by a user and then convert the voice signal into a plurality of candidate keywords.

As shown in FIG. 6, it is assumed that after processing audio data in the STT module 610, "Moo" is derived as a first candidate keyword and a recognition coefficient (accuracy) is derived as 0.8.

It is assumed that "Mod" is derived as a second candidate keyword and the recognition coefficient (accuracy) is derived as 0.7.

It is assumed that "Mood" is derived as a third candidate keyword and the recognition coefficient (accuracy) is derived as 0.2.

It is assumed that "No" is derived as a fourth candidate keyword and the recognition coefficient (accuracy) is derived as 0.1.

In this situation, the conventional art has a problem that a multimedia device does not take any action because the STT module 610 selects "Moo" with the highest recognition coefficient and a corresponding option does not exist on the screen shown in FIG. 5.

In contrast, according to an embodiment of the present disclosure, as described above, a keyword with a relatively high probability may be derived using the dictionary model 630 updated in real time depending on a screen and state of the multimedia device, as described above.

For example, text information (e.g., Mood or Night) provided by the currently executed application is updated in the dictionary model 630.

Therefore, the regression analysis module 620 outputs the "Mood" stored in the dictionary model 630 regardless of the recognition coefficient output from the STT module 610 and has a technical effect of deriving a result that corresponds to user intention.

In FIG. 6, the information stored in the dictionary model 630 is text information provided by the application, and thus when any of the candidate keywords output from the STT module 610 matches the information stored in the dictionary model, a command corresponding to the corresponding keyword is immediately executed.

However, according to another embodiment, when the information stored in the dictionary model 630 is text information obtained through ACR, OCR, or the like, even if there is a candidate keyword output from the STT module 610 that matches the information stored in the dictionary model, the command corresponding to the keyword is not executed immediately, but only the recognition coefficient is increased.

The reason for designing as such is that when the text information stored in the dictionary model 630 is EPG information or text information output through an application, there is almost no possibility of error, but information detected through ACR or OCR has a possibility of error.

Figure 7:
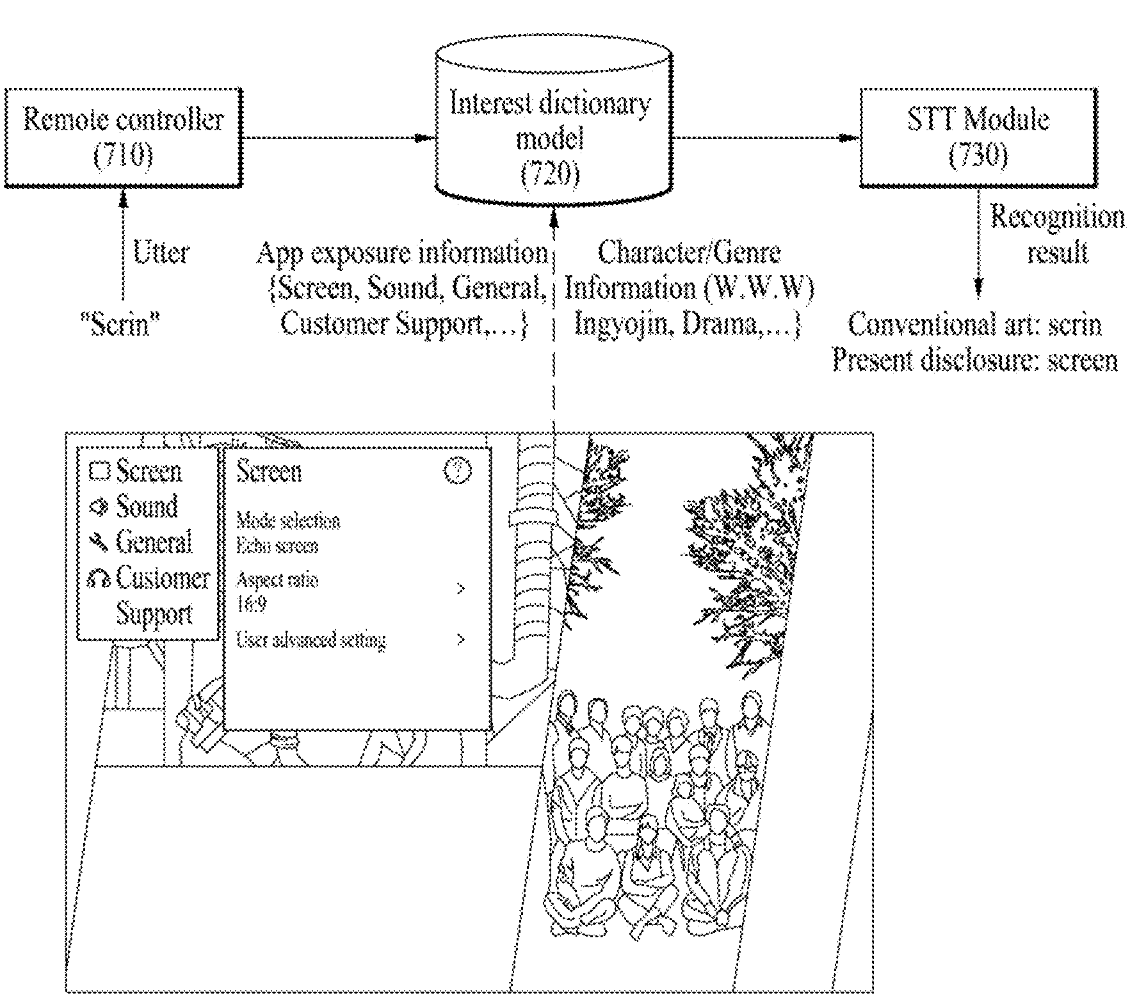
FIG. 7 illustrates a process for improving voice recognition performance by using application information stored in an interest dictionary model by a multimedia device according to an embodiment of the present disclosure.

FIG. 7 illustrates a process for improving voice recognition performance by using application information stored in an interest dictionary model by a multimedia device according to an embodiment of the present disclosure.

As shown in FIG. 7, it is assumed that a user utters "scrin" (the user intention is to select "screen") through a microphone attached to a remote controller 710.

Voice audio data received by the remote controller 710 is delivered to the multimedia device via a wireless network such as Bluetooth.

A STT module 730 in the multimedia device searches for presence of identical or similar keywords with reference to an interest dictionary model 720 stored in the memory.

The text information of the application includes "screen," and thus the STT module 730 may select "screen" accurately.

Figure 8:
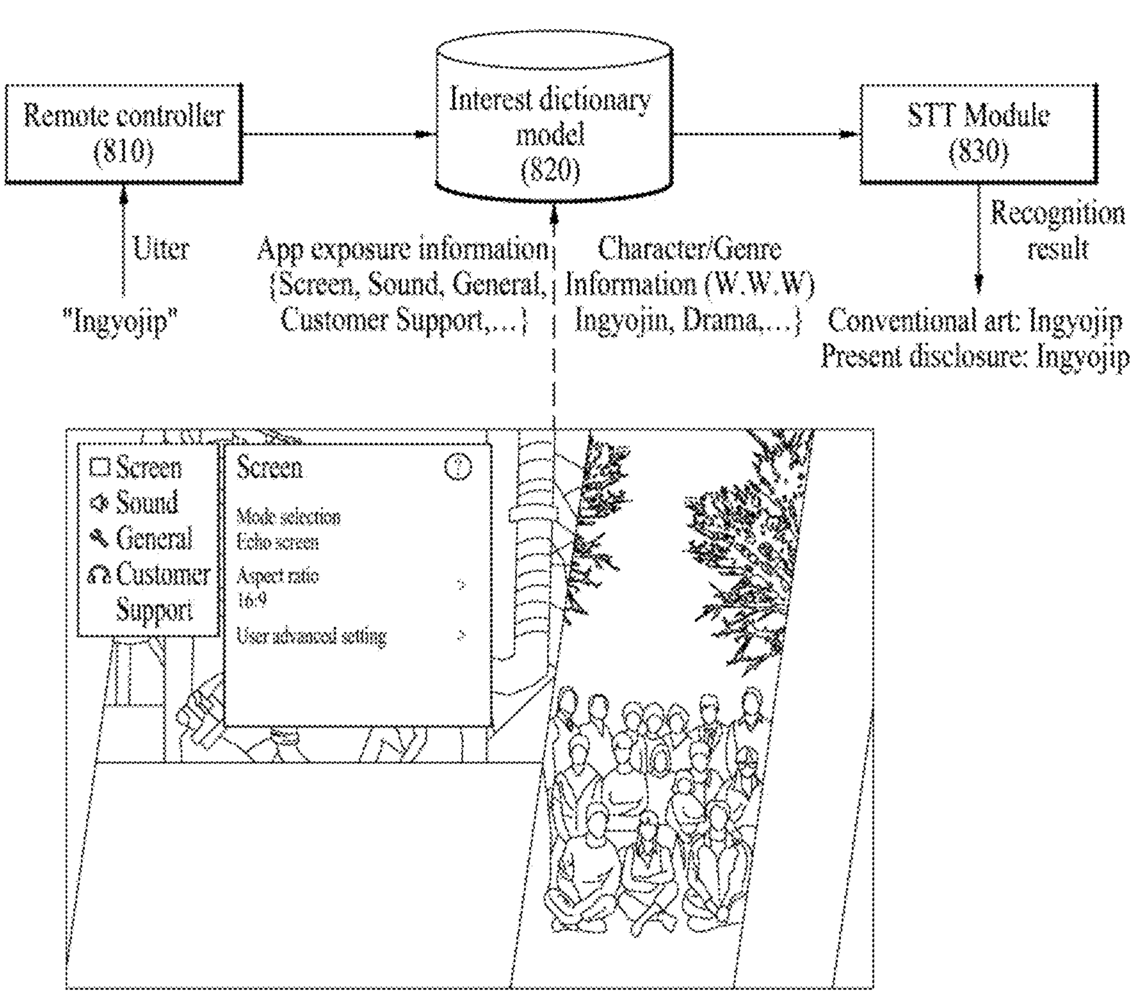
FIG. 8 illustrates a process for improving voice recognition performance by using EPG information or object recognition information stored in an interest dictionary model by a multimedia device according to an embodiment of the present disclosure.

FIG. 8 illustrates a process for improving voice recognition performance by using EPG information or object recognition information stored in an interest dictionary model by a multimedia device according to an embodiment of the present disclosure.

As shown in FIG. 8, it is assumed that a user utters "Ingyojip" (the user intention is to select "Ingyojin") through a microphone attached to a remote controller 810.

Voice audio data received by the remote controller 810 is delivered to the multimedia device via a wireless network such as Bluetooth.

A STT module 830 in the multimedia device searches for presence of identical or similar keywords with reference to an interest dictionary model 820 stored in the memory.

However, unlike FIG. 7, FIG. 8 illustrates a case in which the identical or similar keywords to the text information provided by the application do not exist in the interest dictionary model 820.

This case is designed to be divided into two situations.

When "Ingyojin," which is similar to "Ingyojip" uttered by the user, is stored in the interest dictionary model 820, but a source thereof is received from EPG information, the multimedia device is designed to immediately execute the function corresponding to "Ingyojin."

In contrast, when "Ingyojin," which is similar to "Ingyojip" uttered by the user, is stored in the interest dictionary model 820, but a source thereof is received through a video information analysis algorithm such as ACR, the multimedia device does not immediately execute the function corresponding to "Ingyojin," but is designed to increase the recognition coefficient to increase the probability that "Ingyojin" is selected. As described above, this is because there is a possibility of errors contained in information obtained through ACR/OCR, or the like compared with EPG information or application information.

Figure 9:
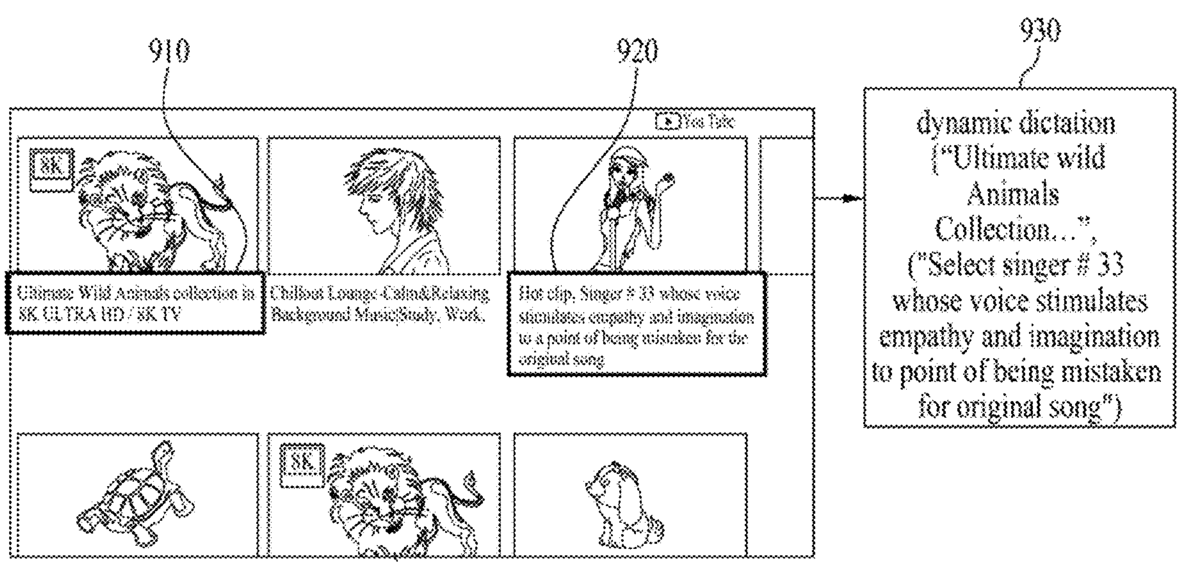
FIG. 9 illustrates a case in which a multimedia device according to an embodiment of the present disclosure executes an arbitrary application.

FIG. 9 illustrates a case in which a multimedia device according to an embodiment of the present disclosure executes an arbitrary application.

As illustrated in FIG. 9, the multimedia device according to an embodiment of the present disclosure detects additional information of content (e.g., EPG information, information extracted from a video (e.g., using ACR) or text information output through an application).

For example, a first text information 910 provided by the application, and a second text information 920 are stored in an interest dictionary model 930 and used to enhance user voice recognition performance.

In particular, the technical effects and performance of the present disclosure compared to the conventional art are described below with reference to FIG. 10.

Figure 10:
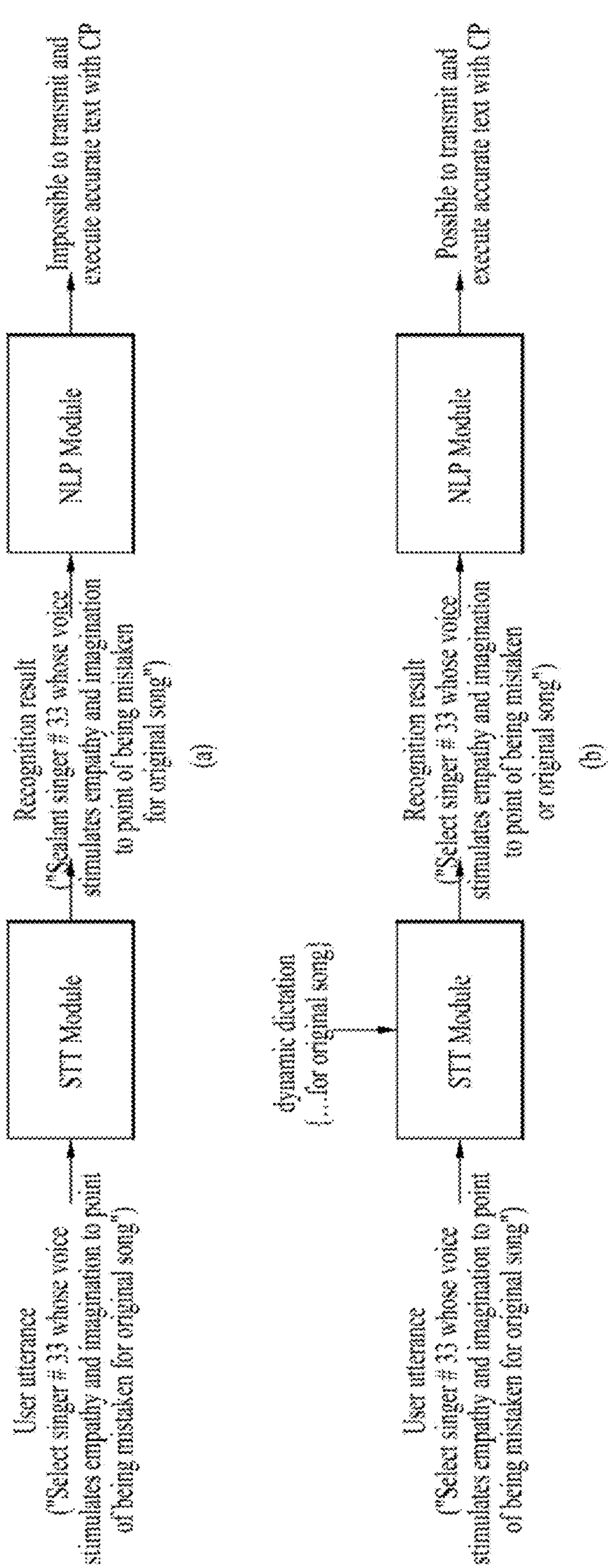
FIG. 10 illustrates a recognition process for a specific keyword in a screen shown in FIG. 9.

FIG. 10 illustrates a recognition process for a specific keyword in a screen shown in FIG. 9. FIG. 10 assumes that a user voice is received in a situation in which a multimedia device outputs a screen shown in FIG. 9.

(a) of FIG. 10 illustrates a process of recognizing and processing a user voice according to the conventional art, while (b) of FIG. 10 illustrates a process of recognizing and processing a user voice according to an embodiment of the present disclosure.

First, with reference to (a) of FIG. 10, a process of executing a voice function by a multimedia device according to the conventional art is described.

When a user using a multimedia device utters "Select singer #33 whose voice stimulates empathy and imagination to a point of being mistaken for the original song," the STT module in the multimedia device converts the corresponding audio data into text into a text by using a voice recognition processing algorithm. In this case, it is assumed that the text output through the STT module is "Sealant singer #33 whose voice stimulates empathy and imagination to a point of being mistaken for the original song," due to a performance problem of the STT algorithm or the inaccuracy of the user voice.

Therefore, a natural language process (NLP) module has a difficulty distinguishing a command "select" from the entire text, and there is a problem in that the corresponding video is not executed because a text containing errors is transmitted to CP.

In contrast, with reference to (b) of FIG. 10, a process of executing a voice function by a multimedia device according to an embodiment of the present disclosure is described.

When a user using a multimedia device utters "Select singer #33 whose voice stimulates empathy and imagination to a point of being mistaken for the original song," the STT module in the multimedia device converts the corresponding audio data into text into a text by using a voice recognition processing algorithm.

In particular, unlike the conventional art, the corresponding image is executed without a problem because the text with some errors may be corrected and the correct text without errors may be delivered to the CP with reference to the interest dictionary model (stored in memory) described above.

Figure 11:
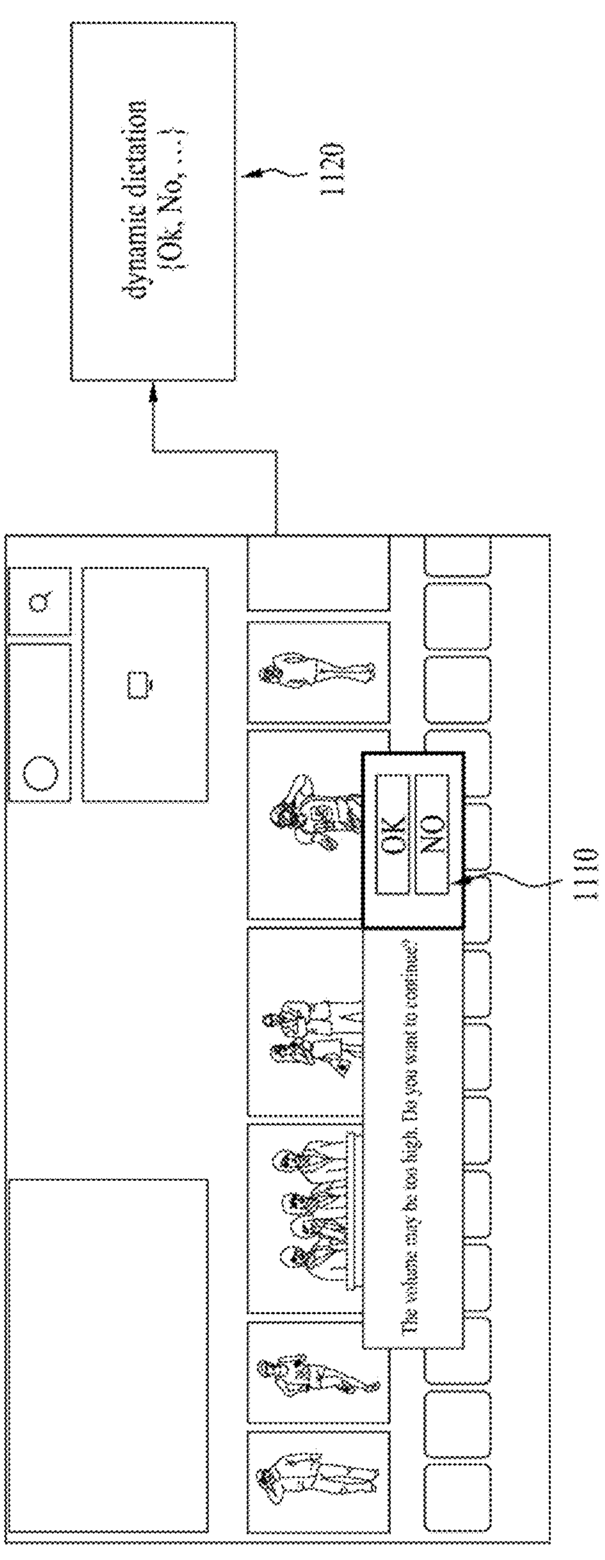
FIG. 11 illustrates a case in which a multimedia device according to an embodiment of the present disclosure executes an arbitrary application.

FIG. 11 illustrates a case in which a multimedia device according to an embodiment of the present disclosure executes an arbitrary application.

As illustrated in FIG. 11, the multimedia device according to an embodiment of the present disclosure detects additional information of content (e.g., EPG information, information extracted from a video (e.g., using ACR) or text information output through an application).

For example, text information 1110 in a menu provided by an application is stored in an interest dictionary model 1120 and used to enhance user voice recognition performance.

In particular, the technical effects and performance of the present disclosure compared to the conventional art are described below with reference to FIG. 12.

Figure 12:
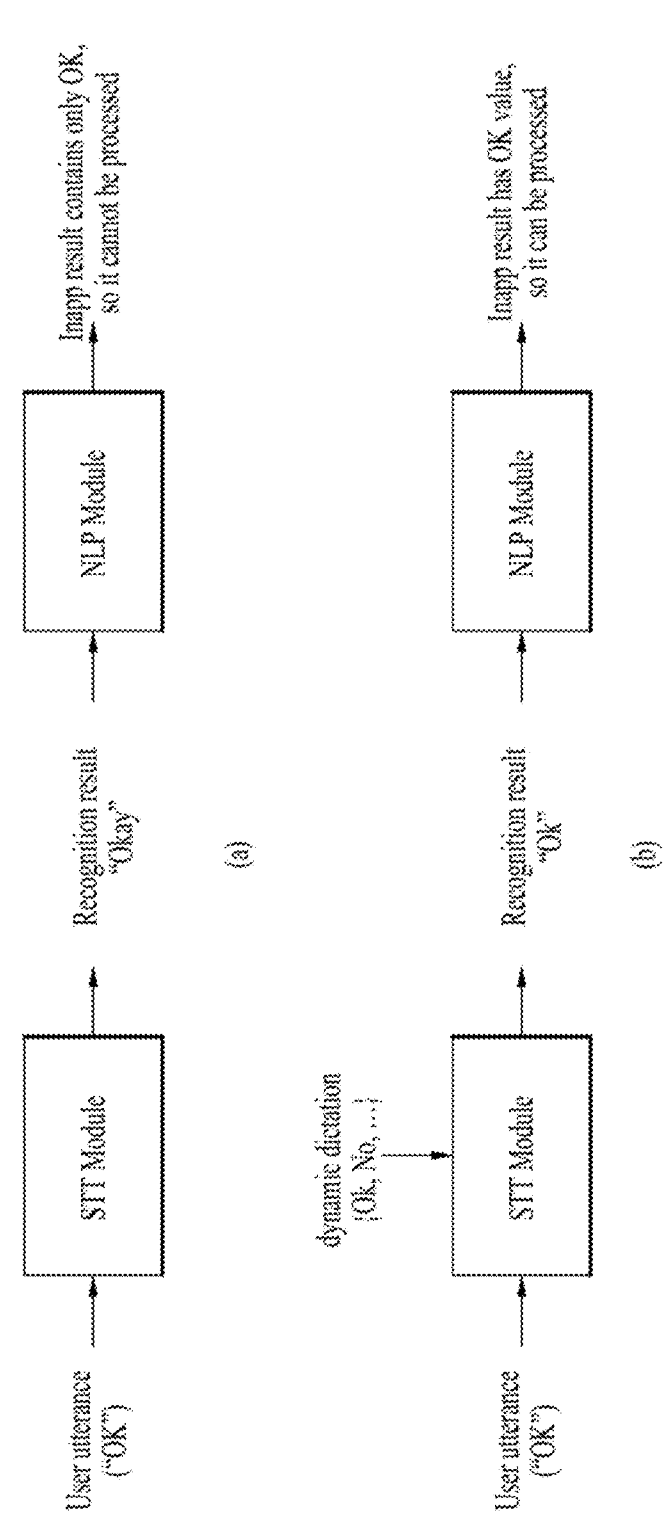
FIG. 12 illustrates a recognition process for a specific keyword in a screen shown in FIG. 11.

FIG. 12 illustrates a recognition process for a specific keyword in a screen shown in FIG. 11.

FIG. 12 assumes that a user voice is received in a situation in which a multimedia device outputs a screen shown in FIG. 11.

(a) of FIG. 12 illustrates a process of recognizing and processing a user voice according to the conventional art, while (b) of FIG. 12 illustrates a process of recognizing and processing a user voice according to an embodiment of the present disclosure.

First, with reference to (a) of FIG. 12, a process of executing a voice function by a multimedia device according to the conventional art is described.

When a user using a multimedia device utters "Okay," the STT module in the multimedia device converts the corresponding audio data into a text by using a voice recognition processing algorithm. In this case, unlike in FIG. 10, it is assumed that "Okay" is recognized accurately.

However, execution command information of the corresponding application includes "OK" as shown in FIG. 11, not "Okay," there is a problem in that a multimedia device according to the conventional art may not execute the voice command "Okay".

In contrast, with reference to (b) of FIG. 12, a process of executing a voice function by a multimedia device according to an embodiment of the present disclosure is described.

When a user using a multimedia device utters "OK," the STT module in the multimedia device converts the corresponding audio data into a text by using the voice recognition processing algorithm and extracts the corresponding "OK" with reference to the interest dictionary model described above (stored in the memory).

As shown in FIG. 11, the screen includes "OK," and it is expected that a multimedia device according to an embodiment of the present disclosure may execute the corresponding voice command "OK".

Figure 13:
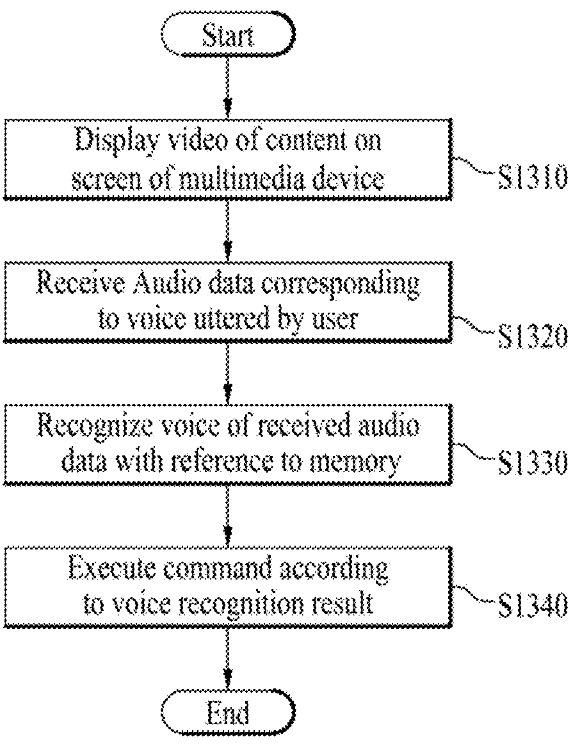
FIG. 13 is a flowchart illustrating a method of controlling a multimedia device according to an embodiment of the present disclosure.

FIG. 13 is a flowchart illustrating a method of controlling a multimedia device according to an embodiment of the present disclosure. With reference to FIGS. 1 to 12 described above, those skilled in the art may provide supplementary interpretations of FIG. 13.

As illustrated in FIG. 13, a multimedia device according to an embodiment of the present disclosure displays a video of arbitrary content on a screen (S1310). The arbitrary content includes, for example, at least one of a broadcast program, a video on demand (VOD) service, and an over the top (OTT) service.

The multimedia device receives audio data corresponding to the voice uttered by the user (S1320). The audio data may be received by the multimedia device via a remote controller or may be received directly through a microphone included in the multimedia device.

With reference to the memory (such as the interest dictionary model described above), the voice of the received audio data is recognized (S1330).

The multimedia device is designed to execute a command according to the voice recognition result (S1340).

In particular, according to an embodiment of the present disclosure, unlike the conventional art, for the same voice, different voice recognition results are produced depending on the additional information of the content.

As described above, to enhance voice recognition performance, a multimedia device according to an embodiment of the present disclosure performs a voice recognition process in consideration of additional information of content (e.g., at least one of electronic program guide (EPG) information, information extracted from the video, or text information output through an application).

Although not illustrated in FIG. 13, when performing operation S1330 described above, a multimedia device according to another embodiment of the present disclosure converts audio data received in operation S1320 into a plurality of candidate keywords through a speech to text (STT) module.

When a specific keyword from among the plurality of candidate keywords matches the EPG information or the text information stored in the memory (such as the interest dictionary model described above), a multimedia device according to another embodiment of the present disclosure is designed to immediately execute a command according to the specific keyword.

In contrast, when a specific keyword from among the plurality of candidate keywords matches information extracted from the video, a multimedia device according to another embodiment of the present disclosure increases a recognition coefficient for the specific keyword. As described above, the design is obtained in consideration of the possibility that errors occur in information extracted from the video using ACR, or the like.

Implementing the method illustrated in FIG. 12 as a device also falls within another scope of the present disclosure.

For example, a multimedia device according to an embodiment of the present disclosure includes a display, a microphone, and a controller.

The display displays a video of arbitrary content, and the microphone receives audio data corresponding to a voice uttered by the user.

The controller recognizes voice of the received audio data with reference to a memory and executes a command according to the voice recognition result.

In particular, as described above, according to the present disclosure, the voice recognition result may vary depending on additional information of the currently executed content. For example, there is a technical effect of improving voice recognition performance by using additional information that is updated in real time to the interest dictionary model of the memory.

The present disclosure described above may be implemented as a computer-readable code on a medium in which a program is recorded. Computer-readable media includes any type of recording device that stores data to be read by a computer system. Examples of computer-readable media include hard disk drives (HDDs), solid state disks (SSDs), silicon disk drives (SDDs), ROMs, RAMs, CD-ROMs, magnetic tapes, floppy disks, optical data storage devices, and also those implemented in the form of carrier waves (e.g., transmitted over the Internet). The computer may include a controller. Accordingly, the detailed description should not be construed as restrictive in all respects but should be considered illustrative. The scope of the present disclosure should be determined by a reasonable interpretation of the appended claims, and all changes within the equivalent scope of the present disclosure are intended to be included within the scope of the present disclosure.

MODE FOR INVENTION

Various embodiments of the present disclosure have been described in "Best Mode" which is the previous content, and it should be appreciated to combine the embodiments described in two or more figures by those skilled in the art as needed belongs to the scope of the present disclosure.

INDUSTRIAL APPLICABILITY

The present disclosure is applicable to various multimedia devices such as a television (TV), a set top box (STB), a personal computer (PC), and a mobile phone which have a voice recognition function, and therefore, may have industrial applicability.

The invention claimed is:

1. A method of controlling a multimedia device, the method comprising:

displaying a video of content on a screen of the multimedia device;

receiving audio data related with a voice uttered by a user;

recognizing a voice of the received audio data with reference to a memory; and executing a command according to a recognition result of the voice, wherein the recognition result of the voice varies depending on additional information of the content, wherein the additional information of the content includes electronic program guide (EPG) information and information extracted from the video, wherein the method further comprises conducting a different action according to which information between the EPG information and the information extracted from the video a specific keyword of the received audio data matches, wherein the method further comprises increasing a recognition coefficient for the specific keyword from among a plurality of candidate keywords when the specific keyword matches the information extracted from the video.

2. The method of claim 1, wherein the additional information of the content further includes text information output through an application.

3. The method of claim 2, wherein the additional information of the content is stored in the memory.

4. The method of claim 3, further comprising converting the received audio data into the plurality of candidate keywords through a speech to text (STT) module.

5. The method of claim 4, further comprising executing a command according to the specific keyword from among the plurality of candidate keywords when the specific keyword matches the EPG information or the text information stored in the memory.

6. The method of claim 1, wherein the multimedia device includes a television (TV), and the audio data is received through a microphone of the TV or a remote controller.

7. A multimedia device comprising:

a display configured to display a video of content on a screen of the multimedia device;

a microphone configured to receive audio data related with a voice uttered by a user; and a controller configured to recognize a voice of the received audio data with reference to a memory and execute a command according to a recognition result of the voice, wherein the recognition result of the voice varies depending on additional information of the content, wherein the additional information of the content includes electronic program guide (EPG) information and information extracted from the video, wherein the controller is configured to conduct a different action according to which information between the EPG information and the information extracted from the video a specific keyword of the received audio data matches, wherein the controller is further configured to increase a recognition coefficient for the specific keyword from among a plurality of candidate keywords when the specific keyword matches the information extracted from the video.

8. The multimedia device of claim 7, wherein the additional information of the content further includes text information output through an application.

9. The multimedia device of claim 8, wherein the additional information of the content is stored in the memory.

10. The multimedia device of claim 9, wherein the controller is configured to convert the received audio data into the plurality of candidate keywords through a speech to text (STT) module.

11. The multimedia device of claim 10, wherein the controller is configured to execute a command according to the specific keyword from among the plurality of candidate keywords when the specific keyword matches the EPG information or the text information stored in the memory.

12. The multimedia device of claim 7, wherein the multimedia device includes a television (TV), and the microphone is attached to the TV or a remote controller.

* * * * *